United States Patent [19]

Metz et al.

[11] 3,890,345

[45] June 17, 1975

[54] PREPARATION OF PYRROLINES BY THE AMINATION OF KETONES

[75] Inventors: Fred L. Metz, Painesville; James A. Scozzie, Wickliffe, both of Ohio

[73] Assignee: Diamond Shamrock Corporation, Cleveland, Ohio

[22] Filed: Feb. 21, 1973

[21] Appl. No.: 334,235

[52] U.S. Cl. .......................................... 260/313.1
[51] Int. Cl. ............................................. C07d 27/14
[58] Field of Search ................................. 260/313.1

[56] References Cited
UNITED STATES PATENTS 3,259,632  7/1966  Fremery............................ 260/313.1

*Primary Examiner*—Joseph A. Narcavage
*Attorney, Agent, or Firm*—Timothy E. Tinkler

[57] ABSTRACT

Nitrogen-containing heterocyclic compounds having five ring atoms are prepared by the vapor phase reaction of olefinic ketones with ammonia at elevated temperatures and in the presence of a porous metal oxide catalyst.

8 Claims, No Drawings

PREPARATION OF PYRROLINES BY THE AMINATION OF KETONES

BACKGROUND OF THE INVENTION

A number of five-membered nitrogen-containing heterocycles are known that are useful as the compounds per se or as intermediates, particularly for the synthesis of biologically active compounds. The various synthetic productions of these heterocycles can involve addition reactions, replacement of substituents on a preformed ring, or ring closure. Exemplary of the latter is the reaction of a 1,4-dicarbonyl compound, e.g., 2,5-hexanedione, with ammonia to yield 2,5-dimethylpyrrole. Such reactions are not generally commercially practical, however, since the requisite 1,4-dicarbonyl compounds are not readily available.

STATEMENT OF THE INVENTION

Therefore, it is an object of the present invention to provide a simple process for the production of heterocyclic compounds.

It is a further object of the present invention to provide a simple process for the production of heterocyclic nitrogen-containing compounds from commercially available or readily synthesized reactants.

These and further objects of the present invention become apparent to those skilled in the art from the specification and claims that follow.

There has now been found a process for the production of heterocyclic organic compounds having a five-membered nitrogen-containing heterocyclic ring, which process comprises reacting an olefinic ketone having at least two carbon atoms between the carbonyl carbon and the double bond with ammonia at a temperature between about 300° and 600° C in the presence of a porous metal oxide catalyst. More specifically, a ketone having the formula:

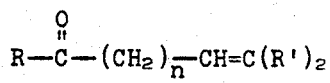

or

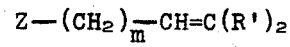

wherein R is aliphatic or aromatic; R' is H or R; Z is cycloalkanone; n is 1 or 2; and m is 0 or 1, is reacted with an excess of ammonia at a temperature between about 300° and 600° C in the presence of a porous metal oxide catalyst. This process is particularly useful for the reaction of olefinic ketones with ammonia in the presence of porous alumina. Owing to the variety of olefinic ketones that may be employed as reactants, it is possible by this process to tailor make a large number of five-membered nitrogen-containing heterocycles, both substituted and unsubstituted, by selection of the proper ketone. Further, the reaction can be made to proceed with good conversion of the ketone and a high selectivity to the desired product.

DESCRIPTION OF THE PREFERRED EMBODIMENTS

The process of the present invention is applicable to the conversion of a wide variety of olefinic ketones, substituted and unsubstituted, into five-membered nitrogen-containing heterocycles. Ketone precursors are also contemplated. Most of these ketones correspond to formulas:

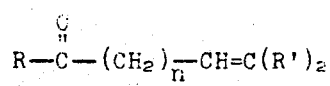

or

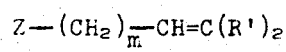

wherein R is a substituted or unsubstituted aliphatic or aromatic radical, preferably a $C_1$-$C_8$ aliphatic radical; R' is H or R; Z is cycloalkanone; n is 1 or 2; and m is 0 or 1. Since closure is effected between the carbonyl carbon and, through the added nitrogen, the gamma carbon atom, it will be apparent that any remaining groups become substituents on the heterocyclic ring.

Illustrative of these ketones and the heterocyclic products of their reaction with ammonia are the following:

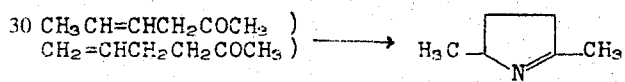

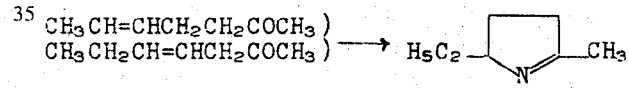

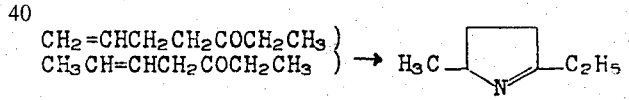

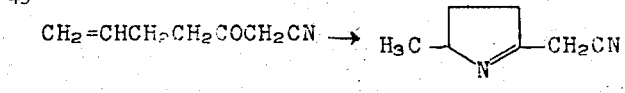

Other useful ketones may include: 3-cyano-5-hexene-2-one, 2-allylcyclohexanone, 2-butenylphenylketone, 3-pentenylcyclohexylketone, 2-vinylcyclohexanone, 2-vinylacetophenone.

Preferred from the foregoing olefinic ketones are: 4-pentene-2-one, 4-hexene-2-one, 5-hexene-2-one, 4-heptene-2-one, and 5-heptene-2-one.

Particularly preferred at this time is 5-hexene-2-one (allylacetone), since the product of its cyclization with ammonia, 2,5-dimethyl-1-pyrroline, is an intermediate in the synthesis of cis-2,5-dimethyl-1-pyrrolidine carboxanilide, a herbicide of considerable importance.

The reaction itself proceeds in the vapor phase by passing the ketone and ammonia simultaneously, and preferably premixed, through or over a fixed bed of catalyst, although a fluidized bed may also be employed.

Pressures employed are generally atmospheric, although values within the range of 0.5 to 25, especially 0.5 to 7.0, atmospheres are useful.

The temperature at which the reaction proceeds is generally within the range of 300°–600° C, the exact temperature depending upon a number of considerations such as the identity of the ketone, the contact time within the reactor, the activity of the catalyst, and the like. A preferred temperature range is between 400° and 550° C. In the instance wherein the ketone is allylacetone, a temperature within a range of 440°–480° C is especially to be preferred. In most instances, it will be found desirable to preheat the reactants to a temperature approaching that at which the reaction proceeds.

In order to avoid decomposition problems at the elevated temperatures involved, the reaction time is preferably quite short, e.g., between 1 and 10 seconds, especially 2-5 seconds, although longer times have been employed. This will depend in part on the temperature of the reactor, the identity of the ketone reactant and product obtained, and the like.

The amount of ammonia employed is at least the theoretical stoichiometric quantity required to react with the ketone to provide the desired product. In practice, however, an excess, e.g., a fivefold, often a tenfold, and preferably even a twentyfold or greater excess, is employed. The use of such large amounts apparently contributes to the specificity of the reaction of the ketone to the desired product without decomposition of the starting material. Any unreacted ammonia is, of course, easily recovered.

The catalysts required to effect the desired selective conversions are generally described as particulate porous metal oxides, for example, thoria, tungsten oxide, molybdenum oxide, kieselguhr, nickel oxide, cobalt oxide, zirconia, and alumina. A high degree of porosity, e.g., 0.2–0.8 ml/gram and preferably 0.5 to 0.7 ml/g, is apparently essential to selective conversion. Particularly preferred at this time for a high rate of selective conversion are high porosity aluminas. These catalysts are useful in particulate form, e.g., as powders, or, more preferably in order to prevent or reduce entrainment of the catalyst in the vapors exiting the reactor, in the form of catalyst pellets prepared by compacting a more highly particulate metal oxide. Preferred catalysts having the desired properties may be readily obtained, for example, by sintering commercially available, relatively pure, aluminas at temperatures in excess of 1100° C, for example, up to 1300° C. These sintered metal oxides are found to have the requisite porosity and, in the preferred case of alumina, a high alpha-alumina content.

In order that those skilled in the art may more readily understand the present invention and certain preferred embodiments by which it may be carried into effect, the following specific examples are afforded.

EXAMPLE 1

The reaction is conducted in a tubular heated reactor (460° C) provided with a preheating zone (300° C) for the reactants, above a fixed catalyst bed, and a dry ice cooled condenser on the outlet to collect both reaction products and excess ammonia. Ammonia and allylacetone are fed to and mixed in the top of said reactor in a mole ratio of 33:1 and at a rate of 10 grams per hour of allylacetone. The reactants pass downward at substantially atmospheric pressure through 200 ml of granular alpha-alumina catalyst (99% through a 5 U.S. Standard mesh screen, 98% on an 8 mesh screen). This catalyst has a pore volume of 0.60 ml/gram, a surface area of about 10.5 square meters/g (measured by the BET method, nitrogen adsorption), a density of 0.64 g/ml, and has been presintered for 2 hours at 1200° C. Catalyst-reactant contact time is 3.9 seconds on the average. The excess ammonia is recycled to provide a continuous process. In this manner, 99.3 % of the allylacetone is converted with a selectivity of 73.4% to 2,5-dimethyl-1-pyrroline.

The following table shows a variation in certain of the reaction parameters and the results thereby obtained, still employing allylacetone as the ketone reactant and obtaining 2,5-dimethyl-1-pyrroline as the product. All reaction parameters unstated in the table are as detailed above. The catalyst differs in having been preheated at 1200° C for 3 hours and having a surface area of 11.4 m²/g, a density of 0.65 g/ml, and a pore volume of 0.60 ml/g.

TABLE

| Run | ALA* (g/hr) | NH₃:ALA | Catalyst Vol. (ml) | Temperature (°C) | Reaction Time (sec) | Conversion (%) | Selectivity (%) |
|---|---|---|---|---|---|---|---|
| 1 | 6 | 58:1 | 140 | 460 | 2.7 | 98.5 | 62.0 |
| 2 | 10 | 45:1 | 225 | 440 | 3.4 | 99.0 | 62.7 |
| 3 | 10 | 33:1 | 200 | 440 | 3.8 | 98.9 | 65.3 |
| 4 | 6 | 30:1 | 140 | 420 | 5.5 | 87.5 | 55.4 |
| 5 | 20 | 26:1 | 200 | 455 | 2.4 | 95.1 | 62.5 |
| 6 | 12 | 25:1 | 200 | 435 | 4.0 | 92.0 | 56.9 |
| 7 | 10 | 24:1 | 140 | 460 | 3.6 | 94.0 | 58.9 |
| 8 | 10 | 17:1 | 140 | 420 | 5.4 | 71.8 | 41.5 |
| 9 | 20 | 16:1 | 200 | 461 | 3.7 | 99.0 | 54.7 |
| 10 | 20 | 12:1 | 200 | 445 | 5.1 | 96.1 | 47.4 |

*ALA = allylacetone

EXAMPLE 2

The reaction of Example 1 is again repeated employing 2-allylcyclohexanone as the ketone. NH₃ and the ketone (33:1) are preheated to about 380° C and fed through the reactor at a temperature of 450° C, with a contact time of 3.6 seconds and at a rate of 10 g ketone/hour. At a 95% rate of conversion, the fused ring nitrogen-containing heterocyclic product is obtained as the major product.

EXAMPLE 3

Illustrating the use of a porous metal oxide catalyst other than alumina, ⅛ inch pellets of 98% zirconium oxide and 2% alumina having a pore volume of 0.2 ml/g, are employed after sintering for 3 hours at 1175°

C. Allylacetone is the ketone fed at a rate of 5.0 g/hr together with a twentyfold excess of NH$_3$ to a reactor at 420° C with a 22 second contact time. A 73% conversion to a product comprising 13% 2,5-dimethylpyrroline is obtained.

We claim:

1. A process for the production of a substituted pyrroline, which process comprises reacting (A) a ketone having the formula:

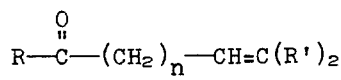

wherein R is a C$_1$-C$_8$ aliphatic radical; R' is H or R; and $n$ is 1 or 2, with (B) an excess of NH$_3$ at a temperature between 400° and 550° C in the presence of a sintered, high porosity, alumina.

2. A process as in cliam 1 wherein the alumina-containing catalyst has been sintered at a temperature in excess of 1100° C.

3. A process as in claim 1 wherein at least a tenfold excess of NH$_3$ is employed.

4. A process as in claim 1 wherein the alumina has a pore volume of at least 0.5 ml/g.

5. A process for the production of 2,5-dimethyl-1-pyrroline, which process consists essentially of reacting allylacetone with an excess of ammonia at a temperature between about 400° and 500° C in the presence of a particulate, high porosity, alumina catalyst.

6. A process as in claim 5 wherein the catalyst is alumina sintered to in excess of 1100° C.

7. A process for the production of 2,5-dimethyl-1-pyrroline with a selectively greater than about 40 percent, which process consists essentially of reacting NH$_3$ and allylacetone in a mole ratio of at least 10:1 and at a temperature between about 440°–480° C for from about 2–5 seconds in the presence of a particulate, high porosity, alumina.

8. A process as in claim 7 wherein the alumina has been sintered at a temperatue in excess of 1100° C.

* * * * *